United States Patent
Takeuchi et al.

[11] Patent Number: 5,958,555
[45] Date of Patent: Sep. 28, 1999

[54] DISPOSABLE WIPER SHEET

[75] Inventors: Naohito Takeuchi, Ehime; Takayoshi Konishi, Kagawa, both of Japan

[73] Assignee: Uni-Charm Corporation, Ehime, Japan

[21] Appl. No.: 08/881,070

[22] Filed: Jun. 24, 1997

[30] Foreign Application Priority Data

Jul. 3, 1996 [JP] Japan .................................. 8-173725
Sep. 27, 1996 [JP] Japan .................................. 8-257032

[51] Int. Cl.$^6$ .................................................. B32B 3/28
[52] U.S. Cl. ........................ 428/152; 428/154; 428/198; 428/156; 428/913; 428/153
[58] Field of Search .................................. 428/154, 198, 428/156, 913, 152, 153

[56] References Cited

U.S. PATENT DOCUMENTS

| | | | |
|---|---|---|---|
| 3,650,882 | 3/1972 | Thomas | 428/154 |
| 3,687,797 | 8/1972 | Wideman | 428/154 |
| 4,309,469 | 1/1982 | Varona | 428/154 |
| 4,469,735 | 9/1984 | Trokhan | 428/154 |
| 5,722,966 | 3/1998 | Christon et al. | 428/154 |

Primary Examiner—William P. Watkins, III
Attorney, Agent, or Firm—Koda & Androlia

[57] ABSTRACT

On both the sides of sheet S1 which is a crepe paper processed by crinkling process and has a low expansion ratio due to the spread of crinkles on liquid impregnation or which is a non-crinkle-processed paper with no expansion, is bonded sheet S2 which is processed by crinkling process and has a higher expansion ratio than the expansion ratio of the sheet S1 due to the spread of crinkles on liquid impregnation. The sheet S1 and the sheet S2 are partially bonded together at each of adhesive parts a, . . . , a with an angle to the direction of the extension of the crinkles formed on the sheet S2. The row of the aligned adhesive parts a, . . . , a is arranged and aligned at a given interval and in a manner parallel to each other. When the individual sheets S1 and S2 are impregnated with liquid chemicals, expansions B are formed between the rows A, A of the adhesive parts a, . . . , a, of sheets S2 owing to the difference in expansion ratio between the sheets S1 and S2. Consequently, disposable wiper sheet 1 can be formed to be highly bulky with irregularities formed on the surface thereof due to the expansions B.

6 Claims, 4 Drawing Sheets

DISPOSABLE WIPER SHEET

BACKGROUND OF THE INVENTION

1. Field of the Invention

The present invention relates to a wet or dry disposable wiper sheet for use in cleaning or sterilizing flush toilets or cleaning the private parts of human bodies or for use in cleaning rooms or for use as wet towel. More specifically, the present invention relates to a disposable wiper sheet of a particularly high volume, compared with conventional ones, so that the disposable wiper sheet can get so handy and can acquire an improved effect of wiping off stain.

2. Description of Prior Art

For cleaning toilets or rooms or as wet towels, use is made of wet wiper. The wet wiper is produced by impregnating a sheet comprising wood pulp fiber with liquid chemicals. The liquid chemicals include surface active agents, disinfectants, deodorants, preservatives, and essence or perfume, other than water and alcohol.

Because conventional wet wipers comprise a single flat sheet or comprise two- or three such sheets overlaid together, the wet wipers have such a low volume that the wipers are very thin. When the wipers are used for cleaning areas while held with hands, therefore, the wipers are held with hands with much difficulty. Hence, the wipers are slippery over hands, with difficulty for use.

Additionally, flat wet wipers are disadvantageous in that the wipers cannot wipe off stain sufficiently from cleaning areas. Particularly, stain present in the recesses of irregular floors are hardly wiped off. Some wet wiper is produced by overlaying two or three flat, water-soluble sheets together and embossing the resulting overlaid sheet to form fine irregularities thereon. The effect of wiping off stain can be enhanced slightly, owing to the formed fine irregularities. Because the total volume of the wiper with such fine irregularities is low, the wiper is neither improved of the conventional problem such that the wiper of such a low volume causes inconvenience in handling when the wiper is held with hands for cleaning work. Furthermore, such fine irregularity has only a limited effect on improving the effect of wiping off stain.

SUMMARY OF THE INVENTION

The present invention relate to a disposable wiper sheet to be used at its wet or dry state, which can overcome the prior art problems. It is an object of the present invention to provide a disposable wiper sheet with such a higher volume that the sheet is readily held with hands for cleaning work and the sheet can confer touch nearly close to the touch of swabbing cloth.

It is the other object of the present invention to provide a disposable wiper sheet produced by forming fine expansions on the surface of a bulky sheet, and forming a great number of irregularities utilizing the expansions on the surface of the sheet not only to prevent the slipping of the sheet from hands but also to improve the effect of wiping off stain on cleaning areas. In accordance with the present invention, a disposable wiper sheet to be used at its wet or dry state for cleaning areas, for cleaning the private parts of human bodies or for other uses is produced by overlaying together a plural types of paper or non-woven fabrics. So as to make the entire disposable wiper sheet bulky, then, expansions are formed on the sheet surface so that the expansions intermittently can be aligned in the same direction thereon. By forming such regularly aligned expansions, the entire sheet gets uneven, involving the improvement of the wiping effect.

One sheet or more sheets in the wiper sheet are produced by subjecting sheet produced by wet paper manufacturing method and the like to crinkling process. In accordance with the present invention, the term "crinkling process" means to form a great number of fine crinkles on a sheet to produce a crepe paper. When the sheet is impregnated with a liquid, the fine crinkles on the sheet (crepe paper) can be reversed and elongated to a size approximately equal to the size prior to crinkling process.

Furthermore, the other sheets also may preliminarily be processed with crinkling process, but with a smaller number of formed crinkles, and therefore, the expansion ratio of the sheets due to the reversion of crinkles on impregnation with an aqueous solution is lower than the expansion ratio of the sheet described above. Otherwise, the other sheets are not processed with any crinkling process, with no resulting expansion even after impregnation with an aqueous solution.

In the disposable wiper sheet, adhesive parts where these sheets adhere to each other are aligned at an interval in the form of a row, and a plurality of such rows of the aligned adhesive parts are arranged at a given pitch. Due to the difference in the expansion ratio after crinkle reversion between the two types of the sheets, expansions are formed in the regions between the rows of the aligned adhesive parts at least on the sheet with a higher expansion ratio, at the same pitch as the pitch between the adhesive parts. Owing to the resulting expansions, the disposable wiper sheet wholly turns bulky.

When water is spotted on the individual sheets bonded together in such disposable wiper sheet, the sheets expand because the crinkles formed thereon by crinkling process are reversed, but due to the presence of the sheet with a lower expansion ratio or non-expanding sheet, the expansion of the sheet with a higher expansion ratio is restricted. Consequently, expansions are generated on the sheet with a higher expansion ratio. As shown in FIG. 2, the expansion of the whole wiper sheet is restricted on the adhesive parts, while the sheet with a higher expansion ratio expands between the adhesive parts. Hence, expansions are formed in the region interposed between the parts (ii), (ii), each part being between the adhesive parts, in the region between the rows of the aligned adhesive parts, while in the region interposed between the adhesive parts (i), (i), valley part (iii) is formed in the region interposed between the adhesive parts (i), (i); and between the valley parts, alternatively, mountainous part (iv) is formed through the expansions. Thus, the mountainous part and valley part are formed at approximately the same pitch as the pitch of the aligned adhesive parts. The mountainous part together with the valley part forms unevenness on the disposable wiper sheet.

The disposable wiper sheet preferably comprises a structure of three layers, wherein a sheet with a higher expansion ratio is bonded to both the front and back surfaces of a sheet with a lower expansion ratio or a non-expanding sheet. Alternatively, the wiper sheet may preferably be of a two-layer structure comprising a sheet with a higher expansion ratio and a sheet with a lower expansion ratio or a non-expanding sheet. Additionally, the wiper sheet may be of a three-layer structure wherein a sheet with a lower expansion ratio or a non-expanding sheet is bonded to both the front and back surfaces of a sheet with a higher expansion ratio.

Each of the individual adhesive parts where the individual sheets are bonded together is formed in a short line and formed also obliquely to the direction of the extension of the crinkles formed on the sheet with a higher expansion ratio and the sheet with a lower expansion ratio. The crinkles formed on the sheet with a higher expansion ratio, in the region interposed between the rows of the adhesive parts, preferably cross over the adhesive parts. If each adhesive part is formed in a short line and obliquely to the direction of the aligning pitch while keeping an adhesive part and its adjacent adhesive part at a state of being partially overlaid to each other in the direction parallel to the direction of the formed crinkles, the crinkles formed by crinkling process at the adhesive parts are segregated from each other. Hence, the crinkles are not connected to each other in the regions on both the sides of the adhesive parts. Therefore, correspondingly to the aligning pitch of the adhesive parts, expansions are independently formed in each of the adjacent regions interposing a row of the adhesive parts, which regions individually reside between the rows of the aligned adhesive parts.

The adhesive parts are preferably aligned at a given pitch in the form of row. However, pitch p between the individual adhesive parts may be variable or the pitch may be variable in a gradual manner toward the row direction. Furthermore, the row of the aligned adhesive parts may extend in a line but the row of the aligned adhesive parts is not necessarily in a line. The row may extend in a curvature or a zigzag line.

So as to effectively exert the effect of wiping, the interval $\alpha$ between the adhesive parts aligned in such row is preferably about 0.5 mm or more to 3.0 mm or less. If the interval $\beta$ between the rows of the aligned adhesive parts is too large, the expansions formed between the rows loose the nerve. Therefore, the effect of the sheet unevenness formed through the expansions on wiping is deteriorated. If the interval $\beta$ between the rows is too narrow, the height of the expansions generated between the rows is reduced. The interval $\beta$ between the rows of the aligned adhesive parts is preferably 7.5 mm or more to 15.0 mm or less.

The interval $\alpha$ (pitch p) between the adhesive parts and the interval $\beta$ between the rows of the aligned adhesive parts influence the high bulkiness of the resulting wiper sheet. Furthermore, the difference in expansion ratio between the sheets overlaid together, which is caused by the reversion of crinkles, also influences the high bulkiness of the wiper sheet. So as to attain an appropriate degree of expansion of the wiper sheet, the aforementioned difference between these sheets is preferably 20% or more to 80% or less, more preferably 30% or more to 60% or less. The term "expansion ratio" herein referred to is represented by the formula $[(\Delta X-X)/X]\times 100\%$, provided that X is the initial length of a sheet and $\Delta X$ is the length of the sheet expanding after reversion of the crinkles when the sheet is floated in a liquid.

The softness and strength of a sheet vary depending on the base weight of the sheet. In accordance with the present invention, the base weight of each of the sheets is preferably 15 g/m$^2$ or more to 75 g/m$^2$ or less. The wiper sheet of a two-layer structure, comprising a sheet with a lower expansion ratio or a non-expanding sheet and a sheet with a higher expansion ratio, has a total base weight of 30 g/m$^2$ or more to 150 g/m$^2$ or less. The wiper sheet of a three-layer structure, where a sheet with a higher expansion ratio is bonded to both the front and back surfaces of a sheet with a lower expansion ratio or a non-expanding sheet, has a total base weight of 45 g/m$^2$ or more to 225 g/m$^2$ or less.

In accordance with the present invention, the raw material sheets are paper made of natural pulp (wood pulp) fiber or paper containing chemical fibers such as rayon, these papers having been processed with crinkling process as described above. Otherwise, the sheets are made of non-woven fabric.

The sheets may be bonded together with hot-melt adhesives such as ethylene vinyl alcohol system (EVA system).

When these sheets are formed from polyolefin resin fibers such as polyethylene and polypropylene or from complex fibers containing these resin fibers, the fibers are thermally bonded together, thereby bonding these sheets together.

The wiper sheet in the form of a wet wiper is preliminarily impregnated with liquid chemicals. The liquid chemicals include a mixture of a surface active agent (surfactant), a disinfectant or deodorant, a preservative, an essence or perfume, etc. with water and alcohol. As has been mentioned above, the sheets bonded together with a hot-melt adhesive or by water-insoluble adhesive means such as hot melting are absolutely never dissociated from each other due to the presence of liquid chemicals contained in the wiper sheet. The wiper sheet of the present invention may be commercially available at dry state, which should preliminarily be impregnated with the liquid chemicals by a user prior to use. The wiper sheet commercially available at dry sheet is produced, by forming expansions on a sheet with a higher expansion ratio by impregnating the sheet in water and the like and then drying the sheet in hot air. Even at its dry state, the sheet can retain crinkles, with no deterioration of the high bulkiness.

The other example of the wiper sheet includes a water-soluble wet wiper. The water-soluble wet wiper is for use in toilet cleaning or cleaning of the private parts of human bodies; after the use, the wet wiper is decomposed with a vast amount of water and is then discharged in a toilet drain. In this case, the individual sheets to be overlaid together should be water-soluble sheets.

The water-soluble sheet (water-soluble paper) comprises for example a natural pulp (wood pulp) fiber, a chemical fiber such as rayon, and a binder. The binder should be water-soluble or can swell in water or should gradually be decomposed in water. The bonding between the fibers in the binder can be cleaved with a vast amount of water. As such binder, use is made of carboxymethyl cellulose and the like. Whether or not the binder is water-soluble or has a swelling property in water depends on the degree of etherification and the number of ester bonds in the binder, the molecular weight thereof, the liquid chemicals impregnated into the water-soluble sheet or the ions contained in the liquid chemicals.

Furthermore, other binders include for example poly (vinyl alcohol), starch, carrageenan, galactomannan, acrylic acid ester and the like.

Even in the water-soluble wet wiper, a water-soluble sheet with a lower expansion ratio or a sheet never expandable is partially bonded to a water-soluble sheet with a higher expansion ratio. For the binding, a binder of a similar type to the water-soluble binder or the binder capable of swelling in water, which is contained in the water-soluble sheet, is used as an adhesive. Using the binder contained in the water-soluble sheet, these water-soluble sheets are partially bonded together. More specifically, by overlaying water-soluble sheets together containing a binder to each other, making parts of the water-soluble sheets contain water or a medium and pressing and heating and drying the parts, the water-soluble sheets are bonded together.

The liquid chemicals work to enhance the strength of a water-soluble wet wiper, by insolubilizing the binder in the water-soluble sheets or an adhesive to be used for bonding the water-soluble sheets together, thereby suppressing the decomposition of the water-soluble sheets in water. When the water-soluble wet wiper is flushed in a flush toilet where the binder in the water soluble sheets or the adhesive is diluted with a vast amount of water thereby solubilizing the binder or the adhesive parts or swelling the binder or the adhesive parts, the decomposition of the water-soluble sheets is not suppressed in water in a toilet reservoir. The liquid chemicals are an aqueous mixture of water and an organic solvent. The organic solvent includes ethanol, isopropyl alcohol and the like. Preferably, the organic solvent contains metal ions such as ions of magnesium, calcium, strontium, and zinc. In the liquid chemicals, the metal ions in the organic solvent are crosslinked with the carboxyl groups in the binder or the adhesive to form a bridged complex. Thus, a complex network structure is formed, whereby the binder or the adhesive turns insoluble. When the water-soluble wet wiper is flushed in a flush toilet, the bridged complex is decomposed in a vast amount of water so that the binder or the adhesive turns water-soluble or is put at a state capable of swelling in water. Thus, the binding between the individual water-soluble sheets turns decomposable, while the water-soluble sheet is at a state with a possibility of decomposition in water.

Preferably, the liquid chemicals contain an organic solvent (including an organic solvent containing a metal ion) in a range of 5% by weight (abbreviated as "wt %" hereinbelow) or more to 95 wt % or less and contain water in a range of 95 wt % or less to 5 wt % or more. For the purpose of wiping off water-soluble stain present on the surface of a toilet, the liquid chemicals should contain water in a range of 30 wt % or more to 95 wt % or less, preferably 40 wt % or more to 95 wt % or less and an organic solvent in a range of 70 wt % or less to 5 wt % or more, preferably 60 wt % or less to 5 wt % or more. The liquid chemicals comprising an organic solvent and water should be impregnated at a weight 0.5-fold or more to 5-fold or less the total weight of the overlaid water-soluble sheets at its dry state. Like the liquid chemicals described above, the present liquid chemicals contain a surface active agent, a fungicide, a deodorant and the like, if necessary.

As has been described above in accordance with the present invention, a disposable wiper sheet can be produced, having a higher bulkiness with expansions appropriately formed and appropriate unevenness. The disposable wiper sheet with recesses and protrusions formed thereon is readily held with hands and can get a greater effect of wiping.

DETAILED DESCRIPTION OF THE PREFERRED EMBODIMENTS

The present invention is now described below in the following preferred embodiments with reference to drawings.

Figure 1:
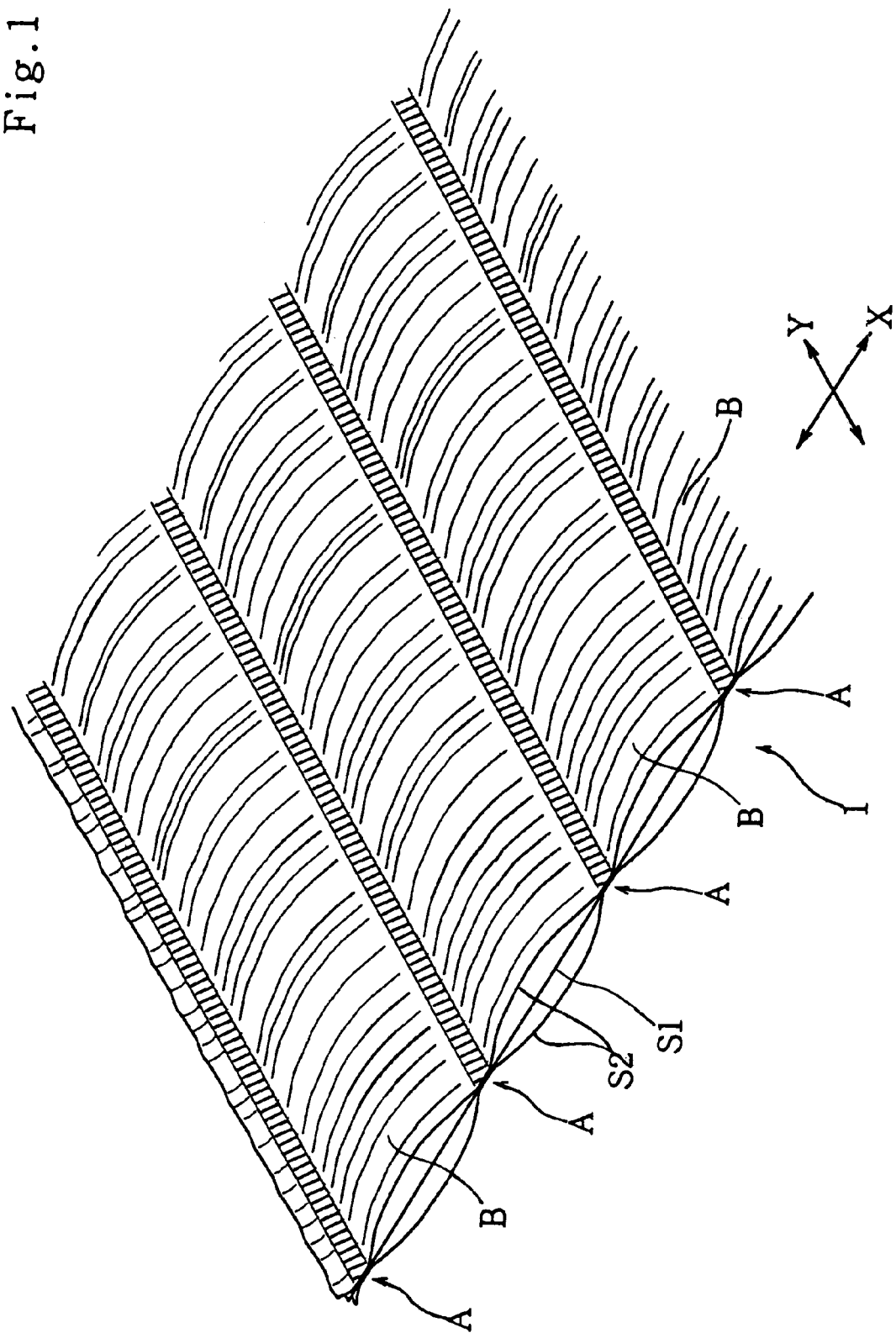
FIG. 1 is a perspective view depicting the disposable wiper sheet in its entirety in accordance with the present invention.

Disposable wiper sheet 1 shown in FIG. 1 is used for cleaning indoors such as toilet room and kitchen and cleaning the private parts of human bodies or for use as wet towel. The disposable wiper sheet 1 may be in the form of a wet wiper impregnated with liquid chemicals or in the form of a dry sheet used at its dry state. The wet wiper is in the form of a water-insoluble wet wiper which cannot be flushed in a flush toilet after use or in the form of a water-soluble wet wiper which can be flushed in a flush toilet after wiping off stain.

The disposable wiper sheet 1 is a lamination body of three structures, comprising sheet S1 and sheet S2 partially bonded through adhesive parts a, . . . , a to both the front and back surfaces of the sheet S1. The sheet S1 is a crepe paper produced by subjecting a sheet formed from pulp fiber or the like as a starting material to the wet paper manufacturing method, followed by crinkling process to form a great number of fine crinkles; or the sheet S1 is a non-crepe paper without crinkling process. Alternatively, the sheet S2 is a crepe paper produced by subjecting a sheet formed from pulp fiber or the like as a starting material by the wet paper manufacturing method followed by crinkling process. The crinkle-processed sheets S1 and S2 wholly expand when these sheets are impregnated with liquid chemicals or the like, whereby the crinkles spread. The expansion ratio of the sheet S2 is larger than the expansion ratio of the sheet S1.

At a given interval along the X direction, the adhesive parts a, . . . , a, are aligned linearly along the Y direction (row direction). When the disposable wiper sheet 1 is impregnated with liquid chemicals and gets wet, the fine crinkles formed by crinkling process are reversed to expand the sheet, but because the sheets S2, S2 have a larger expansion ratio than that of the sheet S1 and the sheets S1 and S2 are partially restricted from each other due to the presence of the adhesive parts a, . . . a, the sheets S2, S2 expand and deform in the region between the adhesive parts a, a. Furthermore, fine expansions B are generated, correspondingly to the alignment pitch of the adhesive parts a, . . . , a along the Y direction.

Figure 2:
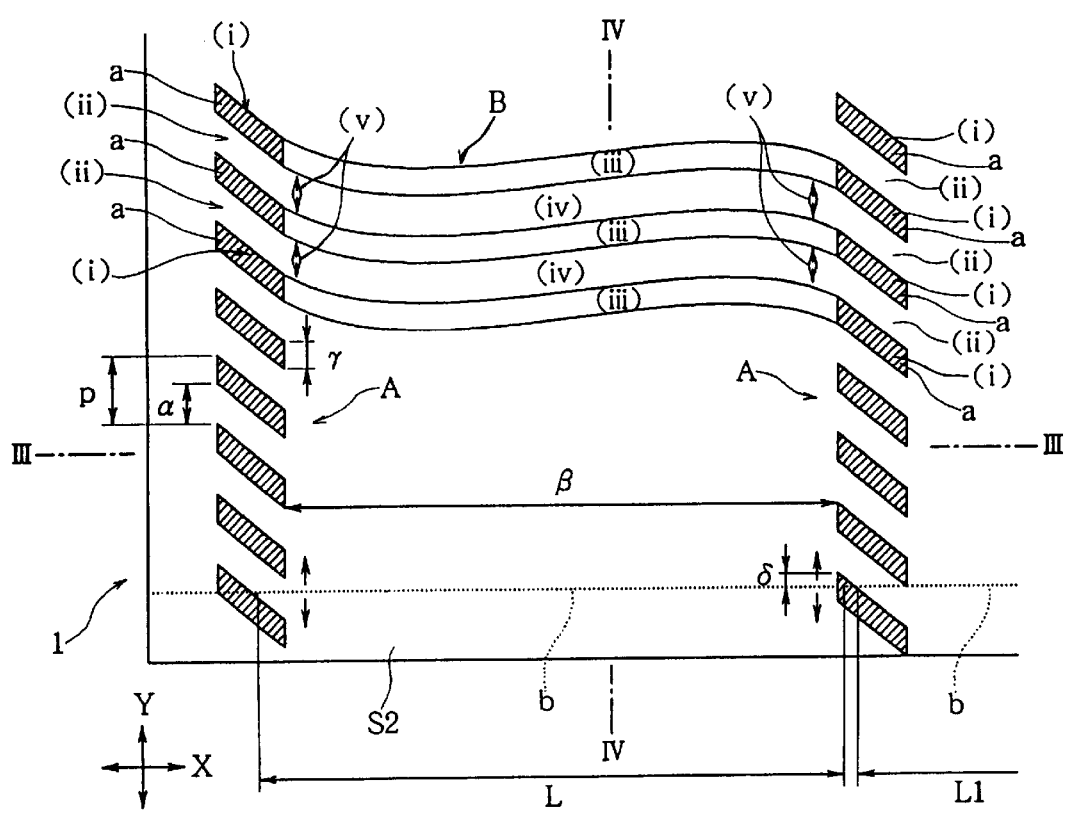
FIG. 2 is an enlarged plane view of FIG. 1, wherein the shape of the adhesive parts and the state of expansions thereby generated are depicted.

FIG. 2 is a partial enlarged view of FIG. 1, where the shape of the adhesive part a, the shape of a row of the aligned adhesive parts a, . . . , a and the state of crinkles appearing on the sheet S2 are schematically shown. The coordinate X-Y in FIG. 2 corresponds to the coordinate X-Y shown in FIG. 1.

The Y direction shows the direction of winding at the paper making process, while the X direction shows the crosswise direction of the sheet and corresponds to the direction of extend of the fine crinkles formed through crinkling process.

As shown in FIG. 2, the adhesive part a is in the form of a short line. A plurality of the adhesive parts a, . . . , a are aligned in a row at a given pitch along the Y direction. The row of the aligned adhesive parts a, . . . , a is represented as A. Through the individual adhesive parts a, . . . ,a, the sheet S1 and the sheets S2 are partially bonded together. The interval between the adjacent adhesive parts a, a in a row is defined as α. The individual adhesive parts a, . . . , a are formed obliquely with individual angles to the direction of pitch p of the adhesive parts a, . . . , a (Y direction) and the direction of forming crinkles b (X direction). The interval between the rows A, A of the adhesive parts a, . . . .a, in alignment is represented as β.

When the individual sheets S1, S2 and S2 are impregnated with liquid chemicals, fine crinkles formed on the sheets S2, S2 are going to spread along the Y direction. Because the sheets S1 and S2 are bonded together at part (i) of the adhesive part a, the expansion of the sheet S2 along the Y direction does not readily occur at the parts (i). On the contrary, the expansion of the sheet S2 along the Y direction readily occurs at part (ii) (in the region in the interval a) interposed between the adhesive part a and the adhesive part a. Due to the expansion (v) along the Y direction, deformation readily occur at the part (ii). Consequently, in the region interposed between the adhesive parts a, a along the X direction, namely in the region L between the rows A, A of the aligned adhesive parts a, . . . , a, valley part (iii) is formed in a band in the region of connecting together the parts (i), (i) of the adhesive parts a, . . . , a on both the sides, while mountainous parts (iv) develop in a band, which connect between the parts (ii), (ii) on both the sides.

Figure 4:
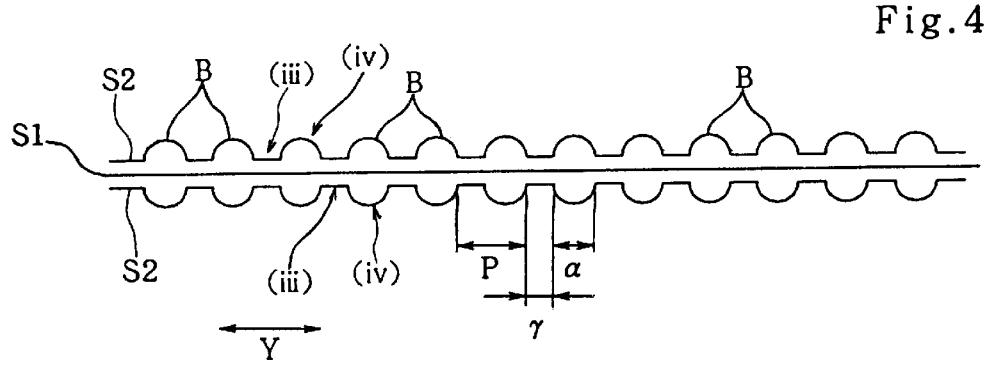
FIG. 4 is a cross-sectional view of FIG. 2 along the line IV—IV.

In the region L interposed between the rows A, A of the adhesive parts a, . . . , a, recesses and protrusions are formed in a repeated manner at a pitch approximately equal to the pitch of the aligned adhesive parts a, . . . , a, whereby fine expansions B develop. FIG. 4 is a cross-sectional view of FIG. 2 along the line IV–IV. As shown in FIG. 4, the valley part (iii) and mountainous part (iv) are alternately formed. The mountainous parts (iv), namely expansions B, are formed at the same pitch as the pitch p of the aligned adhesive parts a, . . . , a. The dimension of the width of the expansions B, namely mountainous part (iv) along the Y direction is determined by the interval a of the adhesive parts a, a. The dimension of the width of the valley part (iii) along the Y direction is determined by the dimension y of the width of the adhesive parts a along the Y direction.

The individual adhesive parts a, . . . , a are formed obliquely with angles to the direction (Y direction) of aligning the adhesive parts a, . . . , a, and to the direction (X direction) of the extension of crinkles b formed on the sheet S2. Furthermore, the adhesive parts a, a are overlaid to each other by the width δ if the individual adhesive parts a, . . . , a are observed at their aligned state along the Y direction. Thus, the crinkles b in the region L between the rows A, A are absolutely segregated through the borderline oblique adhesive parts a, . . . , a, from the crinkles in the adjacent region L1 between the rows A, A. Thus, not any of the crinkles b is in communication over the region L and the adjacent region L1. So as to explain this, in FIG. 2, one crinkle b is representatively illustrated as dash b. Dash b drawn on any part is absolutely segregated by the presence of any one of the adhesive parts a, . . . , a when the dash b elongates over the regions L and L1. Thus, the expansions B on the sheet S2 are independently formed in each of the regions L and L1. By independently formed expansions B, . . . , B in the region L and in the region L1, the expansions B, . . . , B can get stronger nerve, involving a higher strength of the resulting wiper sheet, which is therefore not readily crushed. By such absolute appearance of the expansions B, the whole disposable wiper sheet 1 turns bulky as shown in FIG. 1. Owing to the presence of such expansions B, the disposable wiper sheet is readily held with hands, and because the expansions B cause unevenness on the disposable wiper sheet 1, the effect of the sheet on wiping off stain can be enhanced.

So as to efficiently form expansions B with a constant size on the sheet S2 with a higher expansion ratio, the pitch p of the individually aligned adhesive parts a, . . . , a along the Y direction is preferably set at a constant value. Herein, the pitch may be gradually variable. The interval a at the part (ii) between the adhesive parts a, a determines the dimension of the width of the mountainous part (iv) along the Y direction. If the interval α is too large, however, the width of the mountainous part (iv) is so enlarged that the expansion B formed with the mountainous part (iv) is readily crushed. If continuously using the wiper sheet for wiping, therefore, the expansions B, namely the mountainous parts (iv), is crushed and flattened, with the resultant reduction of the effect of stain wiping. If the interval α is too short, however, the width of the mountainous part (iv) is so excessively short that the expansions B are reduced, with the resultant reduction of the wiping effect and no bulky touch of the resulting wiper sheet.

So as to expand appropriately the mountainous part (iv) to make the wiper sheet 1 bulky thereby enhancing the wiping effect, the interval α between the adhesive parts a, a aligned along the Y direction is preferably set at 0.5 mm or more to 3.0 mm or less. Even at an interval α of 0.5 mm or more to 5.0 mm or less, the wiping effect at the same level as those of conventional sheets or at a higher level can be expected satisfactorily. Even at an interval of 10.0 mm or less, not any serious problem may occur except for the ready crushing of crinkles. Therefore, the interval α may be 0.5 mm or more to 5.0 mm or less, or 0.5 mm or more to 10.0 mm or less.

The dimension γ of the width of the adhesive part a influences the dimension of the width of the valley part (iii) along the Y direction. If the dimension γ of the width is too large, the area occupied by the valley part (iii) is too enlarged on the whole sheet, which causes the disappearance of the high bulkiness from the sheet or which reduces the number of the mountainous parts (iv) to reduce the wiping effect. Thus, the dimension of the width of the valley part (iii) is preferably the same as or less than the dimension of the width of the mountainous part (iv), and therefore, the dimension γ of the width of the adhesive part a is essentially the same as or less than the interval α.

The extent of forming the expansions B on the wiper sheet 1 as well as the extent of the expansion of itself is variable, depending on the interval between the rows A, A of the adhesive parts a, a, extending along the Y direction, namely the interval β between the rows A, A formed by the aligned adhesive parts a, . . . , a.

If the interval β between the rows A, A is too large, the dimension of the width of the region L between the rows A, A is so large that the expansions B in the region L are elongated too much. Thus, the nerve of the expansions B is deteriorated, so that the expansions B are readily crushed during wiping stain. If the interval β between the rows is too narrow, adversely, the ratio of the area of the adhesive parts a, . . . a to the area of the wiper sheet 1, where the expansions B develop, is so excessively large that the high bulkiness of the wiper sheet 1 is deteriorated. Thus, it is preferable that the interval β between the rows of the aligned adhesive parts a, . . . , a should be 7.5 mm or more to 15.0 mm or less. Even at an interval of 20.0 mm or less, the wiper sheet can exert a higher wiping effect than those of conventional wiper sheets, except that the crinkles thereon are readily crushed.

Figure 3A:
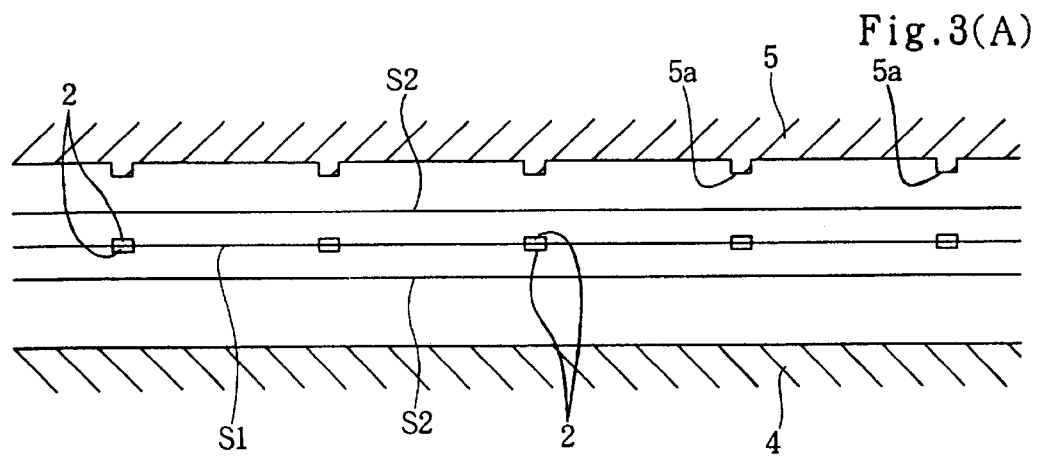
FIG. 3(A), FIG. 3(B) and FIG. 3(C) are views sequentially depicting parts of the process of producing the disposable wiper sheet in accordance with the present invention, as shown as cross sectional views along the line III—III of FIG. 2.

FIGS. 3(A), (B) and (C) sequentially show one example of the process of producing the disposable wiper sheet 1, following the procedures.

As shown in FIG. 3(A), firstly, adhesive 2 is coated on both the front and back surfaces of sheet S1 with a lower expansion ratio or non-expanding sheet S1, and the sheets S2, S2 are overlaid on both the front and back surfaces of the sheet S1. The sheet S1 and the sheet S2 produced from raw materials wood pulp fiber, non-wood pulp fiber or rayon fiber by the wet paper manufacturing method using a Yankee paper machine or a paper machine, are preliminarily processed by crinkling process. As has been described above, the expansion ratio of the sheet S2 after impregnation with liquid chemicals is to be set higher than the expansion ratio of the sheet S1.

So as to generate appropriate expansion between the rows A, A of the adhesive parts a, . . . , a on the sheet S2, the difference in the expansion ratio due to the reversion of crinkles between the sheets S1 and S2 should be preferably 20% or more to 80% or less, more preferably 30% or more to 60% or less. If the difference in the expansion ratio is smaller than the range described above, the whole wiper sheet 1 cannot be bulky; if the difference is above the range, the expansions B of the sheet S2 are too bulky, which causes the mountainous parts (iv) on the expansions B higher, so that the mountainous part (iv) is likely to be readily crushed because of the deteriorated nerve thereof. Additionally, the thickness of the disposable wiper sheet 1 is too large, so when the sheets overlaid to each other and is then packed in a package, the sheet is so bulky in the package.

If the base weights of the sheets S1 and S2 are too large, the resulting disposable wiper sheet 1 loses softness, so that the resulting disposable wiper sheet turns so stiff that the sheet hardly wipes off stain. When the base weights of the sheets S1 and S2 are too low, the strength of the resulting wiper sheet is deteriorated, disadvantageously to cause break of the sheet during wiping work. Thus, the base weights of the sheets S1 and S2 are preferably 15 $g/m^2$ or more to 75 $g/m^2$ or less. When the sheets S1 and S2 with such base weights are used, the disposable wiper sheet 1 of a two-layer structure comprising one sheet S1 and one sheet S2 bonded together has a total base weight of 30 $g/m^2$ or more and 150 $g/m^2$ or less, while the wiper sheet of a three-layer structure comprising sheet S2 bonded to both the front and back surfaces of the sheet S1, has a total base weight of 45 $g/m^2$ or more and 225 $g/m^2$ or less.

Figure 3B:
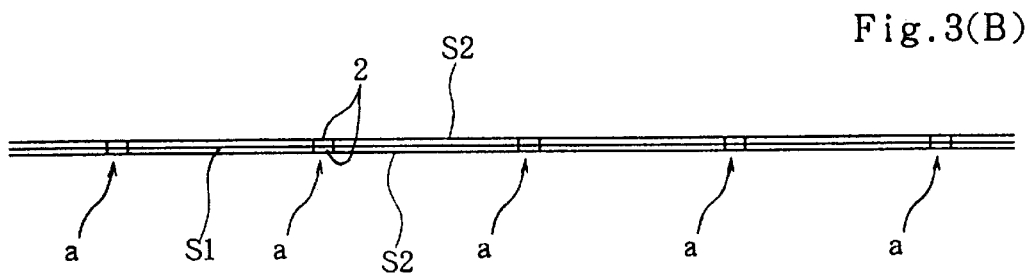

So as to prepare a bonding pattern on the sheet S1 as shown in FIG. 1, adhesive 2 is coated on the sheet S1, and as such adhesive, use is made of adhesives such as water-insoluble polyolefin system such as polyethylene and polypropylene and hot-melt adhesives such as ethylene vinyl alcohol system (EVA system). After coating the adhesive, the sheets S2, S2 are overlaid on both the front and back surfaces of the sheet S1, and the resulting sheet is interposed between heating plates 4 and 5 under pressure while the sheet is moistened. Protrusions 5a matched with the pattern on the adhesive part a is arranged on the heating plate 5, and by means of the emboss 5a, the sheets are pressed and heated to bond the sheets S1 and S2 together at the adhesive parts a, . . . , a. In such manner, the sheets S1 and S2 are bonded together, as shown in FIG. 3 (B).

The disposable wiper sheet 1 thus produced by a bonding process is impregnated with liquid chemicals. The liquid chemicals are mixtures of a surface active agent, a disinfectant or deodorant, a preservative, an essence or perfume, etc. with water and alcohol. After impregnation with the liquid chemicals, the fine crinkles b formed on the sheet S2 expand along the Y direction. Thus, the sheet S2 expands in the region interposed between the adhesive parts a, a along the Y direction as shown in FIG. 2, while in the region L interposed between the rows of the adhesive parts a, . . . , a aligned in the Y direction, the valley part (iii) connecting between the parts (i), (i) of the adhesive part a and the mountainous part (iv) connecting between the parts (ii), (ii) are formed. In such manner, uneven expansions B almost correspondingly to the pitch p of aligning the adhesive part a are formed in the region L interposed between the rows A, . . . , A of the adhesive parts a, . . . , a.

The disposable wiper sheet 1 thus formed is packed at a wet state on impregnation with the liquid chemicals in a plastic container or the like.

The disposable wiper sheet 1 includes for example water-soluble wet wiper as a type of wet sheet. The water-soluble wet wiper is used for cleaning a toilet or other areas or for cleaning the private parts of human bodies. After the use, the wiper is decomposed in a vast amount of water and can be discharged in the drain pipe of a toilet. In this case, the sheets S1 and S2 are water-soluble sheet and can be decomposed in a vast amount of water in a toilet. The sheets S1 and S2 are formed from a raw material such as wood pulp fiber, non-wood pulp fiber, or rayon fiber. As the binder bonding the inter-fibers, use is made of carboxymethyl cellulose. Whether the binder is water-soluble or has a swelling property in water is determined by the degree of etherification, the number of ester bonds, the molecular weight, the liquid chemicals contained in the water-soluble sheet and the ions contained in the liquid chemicals.

As a binder, alternatively, use is made of polyvinyl alcohol, starch, carrageenan, galactomannan, acrylic acid ester, and the like.

As the adhesive to be used at the adhesive part a, then, use is made of those with such swelling properties to be dissociable in water or those that swell in water and are then decomposed in a vast amount of water. As such adhesive, preferably, use is made of the binder for the water-soluble sheets S1, S2, S2. So as to bond the water-soluble sheets S1, S2, S2 together at the adhesive part a, the adhesive may satisfactorily be coated in a pattern on the surfaces of the water-soluble sheets S1, S2, S2. The binder contained in the water-soluble sheets S1, S2, S2 may be used as an adhesive to bond the water-soluble sheets S1, S2 together. More specifically, by overlaying together the water-soluble sheets S1, S2, S2 containing a binder, making parts of the water-soluble sheets S1, S2, S2 contain water or a medium, heating and pressing the parts of the water-soluble sheets S1, S2, S2 followed by drying, the water-soluble sheets can be bonded together.

The liquid chemicals, namely aqueous liquid chemicals impregnated into the individual water-soluble sheets S1, S2, S2, comprise water and an organic solvent. The organic solvent includes ethanol or isopropylene alcohol, and the organic solvent further contains metal ions such as ions of magnesium, calcium, strontium, and zinc. By bridging the carboxyl groups contained in the binders in the individual water-soluble sheets and in the adhesive at the adhesive part a with the metal ions in the liquid chemicals, abridged complex is formed. A complex network structure is formed through the bridged complex to make the adhesive insoluble in water. Therefore, the solubilization or swelling of carboxymethyl cellulose is suppressed so that the resulting water-soluble wet wiper can retain the strength during cleaning. Additionally, the bridged complex is diluted in a vast amount of flushing water in a flush toilet, which causes the decomposition or swelling of the sheet in water and also causes the decomposition or swelling of the adhesive in water, to consequently decompose the water-soluble sheets.

The water-soluble wet wiper is preferably impregnated with the liquid chemicals at a weight of 0.5-fold or more to 5-fold or less to the total weight of the overlaid water-soluble sheets. The organic solvent is preferably contained at 5% by weight or more to 95% or less of the liquid chemicals, while water is contained at 95% by weight or less to 5% by weight or more of the liquid chemicals. When intending to use the water-soluble wet wiper for wiping off water-soluble stain deposited on the surface of a toilet, the liquid chemicals preferably contain water of 30% by weight or more to 95% by weight or less and the organic solvent of 70% by weight or less to 5% by weight or more. More preferably, the liquid chemicals preferably contain water of 40% by weight or more to 95% by weight or less and the organic solvent of 60% by weight or less to 5% by weight or more.

If necessary, the liquid chemicals contain a surface active agent, a fungicide, a deodorant and the like.

When the liquid chemicals are impregnated into the sheet in such manner, the sheet S2 and/or the crinkles formed on the sheet S2 spread to generate expansion on the sheet S2. As has been described above, the center sheet S1 is a crepe paper with a lower expansion ratio even if impregnated with liquid, or a non-crepe paper. The exterior sheets S2, S2 are crinkling-processed crepe paper, and therefore, these sheets spread longer than the sheet S1 when impregnated with a liquid. As has been described above, the difference in the expansion ratio between the sheets S1 and S2 is 20% or more to 80% or less, more preferably 30% or more to 60% or less.

On completion of cleaning work, the bridged complex formed from the metal ions in the liquid chemicals and the carboxyl groups of the carboxymethyl cellulose, is decomposed in a vast amount of water when the disposable wiper sheet 1 is discharged and flushed in a flush toilet, which causes decomposition or swelling of the individual water-soluble sheets S1 and S2, S2 in water, whereby the adhesion of the binders in the individual water-soluble sheets is reduced and the adhesive part a is also solubilized. In this way, the disposable wiper sheet can be decomposed in water in a flush toilet and is then discharged in the drain pipe of a toilet.

The disposable wiper sheet 1 also may be a dry sheet, not limited to such wet wiper. In this case, after bonding the sheets S1, S2 together by adhesion at the production process, impregnating the resulting sheet with the liquid chemicals, or sterilized water or disinfected water or a preservative or the like to generate expansions B on the sheet S2, the disposable wiper sheet 1 is dried in hot air. Even after the resulting disposable wiper sheet 1 is dried, the expansions B can still retain a certain level of expansion, which makes the sheet bulky.

Figure 5:
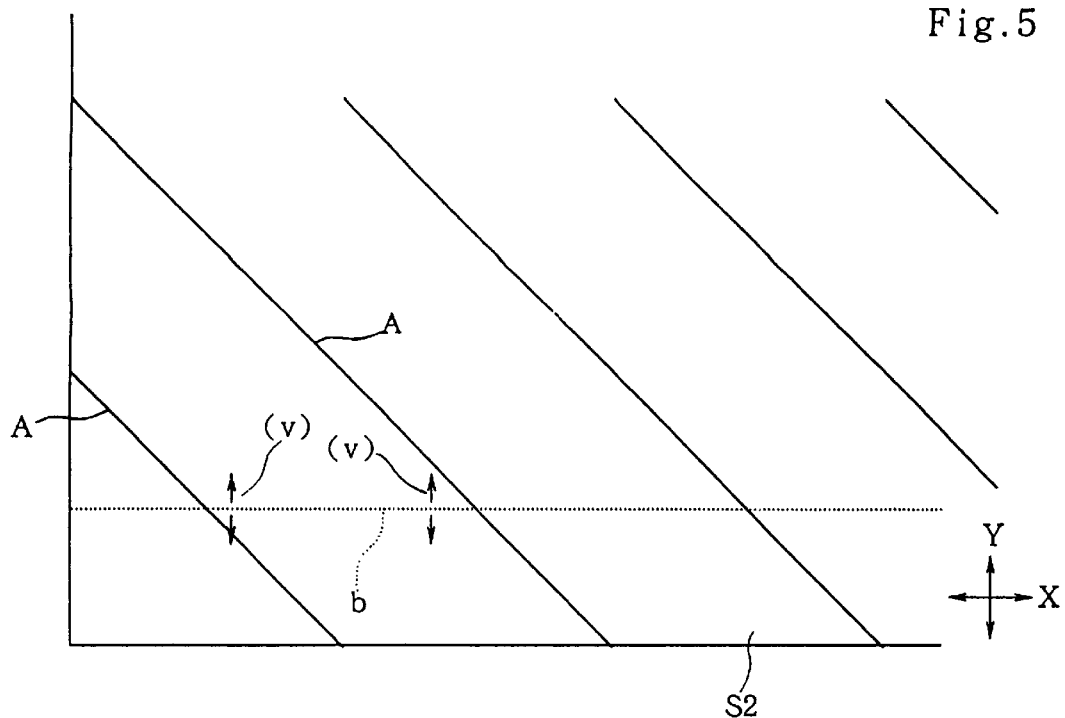
FIG. 5 is a plane view depicting another pattern of forming the adhesive parts.

As shown in FIG. 5, the direction of the rows A, . . . , A of the aligned adhesive parts a, . . . , a may be a direction with an angle to the X direction and Y direction.

As described above, the direction of the rows A, . . . , A of the aligned adhesive parts a, . . . , a is required to be a direction crossing the direction (X direction) of extending crepe crinkles.

In the above description, an example is illustrated wherein the water-soluble sheets S1, S2, S2 are intermittently bonded together at the adhesive parts a, . . . , a, each part thereof being in the shape of a short line, and then by aligning the adhesive parts a, . . . , a at a given pitch, the row A is formed. However, by forming a linear adhesive part along the row A, the water-soluble sheet S1 is bonded to the water-soluble sheets S2, S2 in a continuous line at the adhesive part a. Otherwise, dotted adhesive parts are aligned regularly at a constant interval or randomly in the X-Y direction.

Figure 6A:
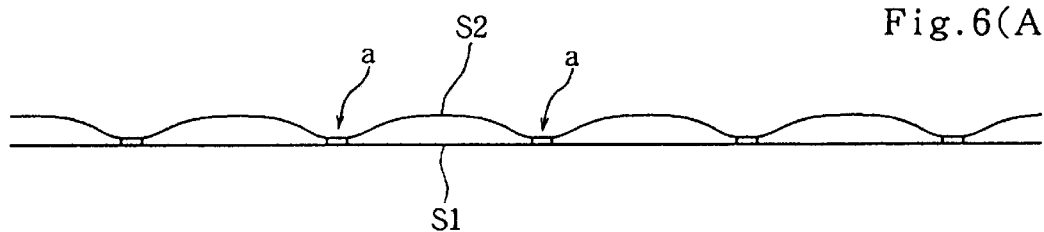
FIG. 6(A) and FIG. 6(B) are cross-sectional views depicting other composition examples of the lamination structure of the disposable wiper sheet.
Figure 6B:
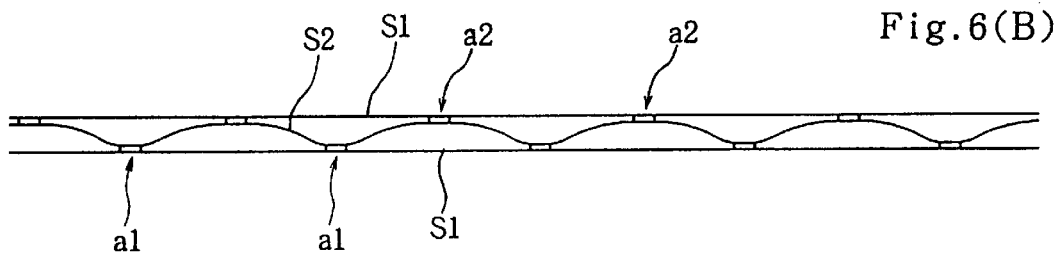

As shown in FIG. 6(A), furthermore, the disposable wiper sheet 1 of the present invention may be of a two-layer structure wherein one sheet S1 with a lower expansion ratio or non-expanding sheet S1 and sheet S2 with a higher expansion ratio are overlaid together. As shown in FIG. 6(B), the wiper sheet 1 is of a three-layer structure, wherein sheet S1 is overlaid on both the front and back surfaces of the sheet S2 and bonded thereon at the adhesive parts a1 and a2 so as to interpose sheet S2 with a higher expansion ratio.

Figure 3C:
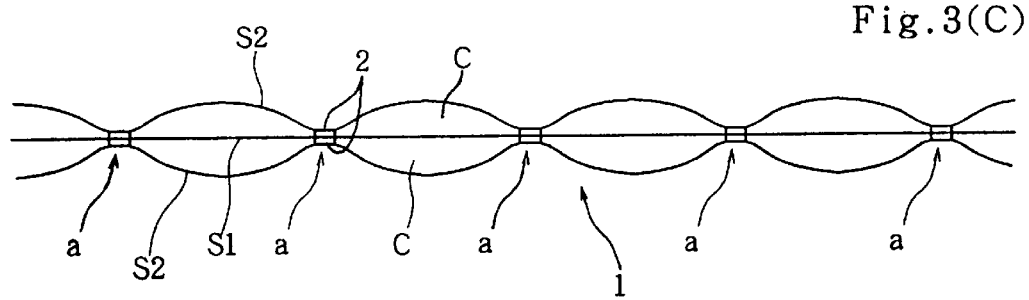

When the wiper sheet 1 is a water-soluble wet wiper and is impregnated with liquid chemicals, the expansion ratio of the water-soluble sheet S2 is larger than the expansion ratio of the water-soluble sheet S1 and therefore, the water-soluble sheet S2 expands in the region interposed between the parts (ii), (ii) between the adjacent adhesive parts a, a, as shown in FIG. 3(C) . Thus, space C is formed between the sheet S1 and water-soluble sheet S2. Hence, the buoyancy of the wiper sheet 1 is thereby increased when disposed in a flush toilet, so that the wiper sheet 1 is hardly flushed therein.

Figure 7:
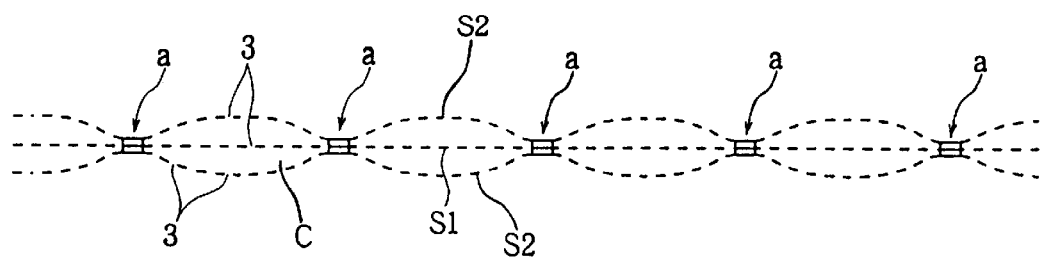
FIG. 7 is a cross-sectional view of a variation example of the disposable wiper sheet of the present invention, wherein a great number of fine pores are punctured through the individual sheets.

As shown in FIG. 7, therefore, a plurality of small pores 3 are preferably punctured out through the sheets S1, S2 or through at least the outer water-soluble sheet S2. When such small pores 3 are punctured out, air in the space C between the water-soluble sheets S1 and S2 is disposed out of the small pores to reduce the buoyancy of the wiper sheet 1 when discharged in a flush toilet, so that the sheet is sunk in the reserved water in the toilet and is so readily flushed therein.

In accordance with the present invention, as has been described above, expansions are formed partially on the surface of the wiper sheet to form unevenness on the surface of the sheet, so that a disposable wiper sheet with a high bulkiness involving a higher effect of wiping off stain can be produced.

As has been described above, further, the expansions B on the surface of the sheet are generated owing to the difference in the expansion ratio between the sheets S1 and S2. Accordingly, the pitch of the expansions B in the Y direction and the length thereof in the X direction can be controlled by the interval α of the adhesive parts a, . . . , a intermittently formed in a row and the interval β of the rows A of the aligned adhesive parts a, . . . , a. Therefore, the sheet can wholly get expansions having a higher strength and being hardly crushed, so the sheet is readily held with hands and has a higher effect of wiping.

EMBODIMENT I

In the disposable wiper sheet of the present invention, the interval α of the adjacent adhesive parts a, a is 0.5 mm or more to 3.0 mm or less, while the interval β of the rows of the adhesive parts a, . . . , a is 5.0 mm or more to 15 mm or less; and the optimum base weights of the sheets S1 and S2 are 15 g/m$^2$ or more to 75 g/m$^2$ or less, individually. So as to determine the height (thickness), softness and wiping-off effect of the disposable wiper sheet thus formed under such conditions, the following wiping-off tests were done.

(1) Test to determine the optimum value of the interval a between the adjacent parts a, a Firstly, the following test was conducted, so as to determine the interval α of the adhesive parts a, . . . , a which could retain the high bulkiness of the disposable wiper sheet and could form appropriate expansions (irregularities) due to the spread of crepe crinkles.

By using as sheet S2 a crepe paper of pulp fiber having a base weight of 60 g/m$^2$ and a sheet expansion ratio of 50% due to crinkles spread when the sheet was impregnated with liquid chemicals or a non-crepe paper of the same pulp fiber having a base weight of 30 g/m², partially coating an adhesive on both the front and back surfaces of the sheet S1, and overlaying the sheet S2 on both the front and back surfaces of the sheet S1 to press and bond these sheets together under pressure by means of heating plates shown in FIG. 3(A), a disposable wiper sheet of a three-layer structure was formed.

Then, five examples of the wiper sheet were produced, by setting the interval a of the adhesive parts a, a on the sheet S1 and the sheet S2 at 0.6 mm, 1.5 mm, 3.0 mm, 5.0 mm and 10.0 mm. In any of the examples, the interval β of the rows of the adhesive parts a, . . . , a was 7.5 mm.

After bonding the sheets S1 and S2 together and impregnating the sheets with liquid chemicals containing water and alcohol, expansions B due to the spread of crinkles were generated on the sheet S2.

As a testing subject (subject to be wiped) of the wiping-off test, tiled kitchen floor was used. The size of the tiled floor was 500 mm×500 mm, with a square protrusion of 28 mm×28 mm surrounded with a groove of a depth of 0.85 mm on the periphery. Sprinkling an appropriate amount of dust or fluff pulp on the floor, the floor was wiped five times with the wiper sheets of the individual examples. The floor state after wiping was examined, and the extent of dust stain and fluff pulp wiped off out of the groove on the tiled floor, was assessed as ○, × and Δ. The degree of crushed expansions on the sheet face used for wiping after termination of wiping work was examined under observation; subsequently, a low degree of crushing was ranked as ○; some degree of crushing was ranked as Δ; and a higher degree of crushing was ranked as ×. Furthermore, the thickness of the wiper sheets was determined prior to use for wiping.

The results of the above test are shown below in Table 1.

TABLE 1

| Interval α (mm) between adhesive parts | | 0.6 | 1.5 | 3.0 | 5.0 | 10.0 |
|---|---|---|---|---|---|---|
| Wiping-off test | dust | ○ | ○ | ○ | Δ | Δ |
| | fluff pulp | ○ | ○ | ○ | ○ | ○ |
| Crushed degree of expansions B after wiping | | ○ | ○ | Δ | Δ | × |
| Thickness of wiper sheet (mm) | | 2.43 | 2.14 | 2.06 | 2.00 | 1.90 |

As shown in Table 1, the wiper sheet with an interval α of the adhesive parts a, a being 0.6 mm has an apparent thickness relatively as large as 2.43 mm, so that the sheet is wholly bulky. The expansions B are formed at an appropriate extent so the sheet can effectively work for wiping off dust and fluff pulp. Additionally, the strength of the expansions B are high (with strong nerve), so that the expansions B are hardly crushed during wiping work. Therefore, wiping could be effected while the high bulkiness was retained.

The wiper sheet with an interval α of the adhesive parts a, a being 1.5 mm has the overall thickness of 2.14 mm, and has a slightly lower bulkiness than the wiper sheet with the interval α of 0.6 mm, but the sheet could clearly wipe off dust and fluff pulp, while the crinkles were hardly crushed. Thus, the sheet was handy.

The wiper sheet with an interval α of the adhesive parts being 3.0 mm has a larger width of expansion B, namely mountainous part (iv), so that the sheet overall is not bulky. The whole thickness of the wiper sheet 1 is as small as 2.06 mm. Because the width of the mountainous part (iv) is too large, the nerve thereof is weak so the expansions B were readily crushed during wiping work.

The wiper sheet with an interval a of the adhesive parts being 5.0 mm has a more enlarged mountainous part (iv) as the expansion B, so that the sheet overall is not bulky. The thickness is as small as 2.0 mm. Because the width of the mountainous part (iv) is large, the nerve of each expansions B is weak so the expansions B were readily crushed. Therefore, the sheet showed a lower effect of wiping off dust.

The wiper sheet with an interval α of the adhesive parts being 10.0 mm has a more enlarged mountainous part (iv), so that the thickness of the sheet 1 is as small as 1.9 mm. Additionally, less irregularities were formed so the sheet had slightly deteriorated effect of wiping off fine stain such as dust, and the crinkles on the sheet were readily crushed after wiping work.

As has been described above, the interval abetween the adhesive parts a, a is preferably 0.5 mm or more to 3.0 mm or less, so as to make the wiper sheet 1 bulky, to make the expansions B on the sheet S2 hardly crushable during wiping work and to procure higher effect of wiping off stain. Compared with conventional sheets, the wiper sheet with an interval a of 0.5 mm or more to 5.0 mm or less has a satisfactory wiping-off effect at a high possibility. The wiper sheet with an interval α of 10.0 mm or less is not so problematic except for the crushing of the expansion B. The interval α is 0.5 mm or more to 5.0 mm or less, preferably 0.5 mm or more to 10.0 mm or less.

(2) Test of the interval between the rows A, A of the adhesive parts

So as to determine the interval β between the rows A, A of the adhesive parts to form appropriate expansion (unevenness) to retain the high bulkiness of the wiper sheet, the following test was conducted.

Using as sheet S2 a crepe paper of pulp fiber having a base weight of 60 g/m² and a sheet expansion ratio of 50% due to crinkles spread when the sheet is impregnated with liquid chemicals and using as sheet S1 a non-crepe paper of the same pulp fiber having a base weight of 30 g/m², partially coating an adhesive on both the front and back surfaces of the sheet S1, and overlaying the sheet S2 on both the front and back surfaces of the sheet S1 to press and bond these sheets together under pressure by means of heating plates shown in FIG. 3(A), a disposable wiper sheet of a three-layer structure was formed. The interval α of the adhesive parts where the sheets S1 and S2 were bonded together was 0.6 mm, based on the results of the test described above in the test (1). By subsequently setting the interval β of the rows of the adhesive parts at four sizes, namely 7.5 mm, 10.0 mm, 15.0 mm and 20.0 mm, the resulting sheets were defined as examples. After bonding the sheets S1 and S2 together and impregnating the resulting sheet with liquid chemicals containing alcohol in water, expansions B due to the spread of crinkles were generated on the sheet S2.

As a comparative example, a wiper sheet was produced by embossing to make the adhesive parts between the sheets S1 and S2 in a dotted pattern.

Using these wiper sheets with different lengths of the interval between the rows A, . . . , A of the adhesive parts a, . . . , a, a wiping-off test was conducted. As a testing subject (subject to be wiped), the same one as in the test (1) was used.

Sprinkling an appropriate amount of dust or fluff pulp on tiled floor, the floor was wiped five times with the wiper sheets of the individual examples and comparative example. The floor state after wiping was examined, and the extent of dust stain and fluff pulp wiped off out of the groove on the tiled floor was assessed as ○, × and Δ. The degree of crushed expansions on the sheet face used for wiping was assessed after termination of wiping work, additionally, and a low degree of crushing was ranked as ○; some degree of crushing was ranked as Δ; and a higher degree of crushing was ranked as ×. Furthermore, the thickness of the wiper sheet was determined, prior to use for wiping.

The results of the above test are shown below in Table 2.

TABLE 2

| Interval β (mm) between rows A, A | 7.5 | 10.0 | 15.0 | 20.0 | Comparative of adhesive parts Example |
|---|---|---|---|---|---|
| Wiping-off test  dust | ○ | ○ | ○ | Δ | Δ |
| fluff pulp | ○ | ○ | ○ | ○ | Δ |
| Crushed degree of expansions B after wiping | ○ | ○ | Δ | × | — |
| Thickness of wiper sheet (mm) | 2.43 | 2.44 | 2.53 | 2.53 | 0.75 |

As shown in Table 2, the wiper sheets with an interval between the rows A, A of the adhesive parts being 7.5 mm and 10.0 mm had an appropriate length of the expansions B generated between the rows A, A along the X direction. The wiper sheets were as thick as 2.43 and 2.44 mm, respectively, so that the resulting sheets overall were bulky. Because these sheets had an appropriate length in the X direction of the expansions B between the rows A, A, the individual expansions B, . . . , B had so strong nerve that the wiper sheets could keep expansions B, . . . , B of a higher strength during the use of wiping. Thus, these sheets could cleanly wipe off dust and fluff pulp. Furthermore, the degree of crushed crinkles was small and even if wiping was conducted continuously, the wiper sheets were kept bulky and were so readily held with hands.

The wiper sheet with an interval β between the rows of the adhesive parts being 15.0 mm had larger expansions B on the sheet S2, and had a larger thickness of 2.53 mm, compared with those of the sheets with an interval between the rows A, A being 7.5 mm and 10.0 mm. The sheet could cleanly wipe off dust and pulp fiber. Because the dimension of the expansions B generated between the rows A, A were long, however, the nerve of the expansions B were slightly weak so that the expansions B were slightly crushed after wiping work.

Because the generation of expansions B was not suppressed by the row A of the adhesive parts a, . . . , a on the sheet of a larger interval β of 20.0 mm, the thickness of the wiper sheet could be as thick as 2.53 mm. However, the dimension of the expansions B in the X direction was so long that the nerve thereof was weakened and the expansions B were readily crushed, with the resultant lesser effect of wiping off dust.

Because the area of the expanding parts was larger than the area of the dotted recess parts in the comparative example wherein the dotted adhesive parts were formed on the whole surface of the wiper sheet and less irregularities were therefore formed thereon, the sheet had poor effect of wiping off dust and fluff pulp.

As shown in FIG. 2 in accordance with the present invention, the expansions B in the region L between the rows A, A of the adhesive parts a, . . . , a are separated through the oblique adhesive parts a, . . . , a from the expansions B in the region L1 adjacent to the region L, and therefore, expansions B are independently formed in the regions L and L1, each region being interposed between the rows A, A of the adhesive parts a, a. Thus, the interval β between the rows A, A determines the length of each of the individual expansions B, . . . , B in the X direction. If the length of the expansions B in the X direction is large, the nerve of the individual expansions B, . . . , B is weakened. If the interval between the rows A, A is short, the area occupied by the adhesive parts a, . . . , a is too large, so that the area of expansions B on the sheet S2 are too small, involving deterioration of the bulkiness.

Hence, the interval between the rows A, . . . , A of the adhesive parts a, . . . , a is preferably 5.0 mm or more to 15.0 mm or less. By setting the interval between the rows A, A at the aforementioned length, the wiper sheet can have a thickness at such a dimension to make the whole surface of the wiper sheet uneven. The adhesive part a can confer an appropriate nerve (strength) to the wiper sheet with the resulting excellent effect of wiping. Except that these expansions may readily be crushed, however, a better effect of wiping can be exerted at an interval β of 20.0 mm or less than conventionally ones.

(3) Test of the base weight of wiper sheet

So as to determine the optimum base weights of the sheets S1 and S2 and the base weight of the resulting wiper sheet from these sheets S1 and S2 in order that the resulting sheet can retain high bulkiness and softness, a test was run using the wiper sheets of Examples 1, 2 and 3 and Comparative Examples 1 and 2 as shown below.

Example 1

A crepe paper of pulp fiber having a base weight of 15 g/m$^2$ and a sheet expansion ratio of 50% due to crinkles spread when the sheet was impregnated with liquid chemicals was defined as sheet S2; a non-crepe paper of the same pulp fiber having a base weight of 15 g/m$^2$ was defined as sheet S1. A wiper sheet of a three-layer structure was formed wherein the sheet S2 was bonded to both the front and back surfaces of the sheet S1, and the resulting wiper sheet was defined as Example 1. The sheets S1 and S2 were bonded together by partially coating an adhesive on both the front and back surfaces of the sheet S1 and overlaying the sheet S2 on both the front and back surfaces of the sheet S1 to press the adhesive-coated part by means of heating plates as shown in FIG. 3. From the results of the tests (1) and (2), the bonding was conducted so that the interval a of the adhesive parts a, a was 0.6 mm and the interval β between the rows A, . . . , A of the adhesive parts a, . . . , a was 7.5 mm.

The interval α and the interval β between the rows were not changed in the following Examples 2 and 3 and Comparative Examples 1 and 2. After bonding together the sheets S1 and S2, the individual sheets were impregnated with liquid chemicals of a mixture of water and alcohol, thereby forming expansions B between the rows A, A of the adhesive parts a, . . . , a on the sheet S2 to form a bulky wiper sheet.

Example 2

In the same manner as in Example 1, sheets comprising pulp fiber were used as sheets S1 and S2. The base weights of the sheets S1 and S2 were individually 30 g/m$^2$, but the following remaining conditions were totally the same as in Example 1; namely the expansion ratios of the sheets S1 and S2 when impregnated with liquid chemicals (the sheet S1 was no-crepe paper, with an expansion ratio of zero), the adhesive agent to bond together the sheets S1 and S2 and the adhering method thereof, the interval a between the adhesive parts, the interval β between the rows of the adhesive parts a, . . . , a, and the liquid chemicals used for impregnating the sheets.

Example 3

Wiper sheets were formed under absolutely the same conditions as in Examples 1 and 2, except that the base weights of the sheets S1 and S2 were modified to 70 g/m$^2$.

As comparative examples of the Examples 1, 2 and 3, the following wiper sheets were formed.

Comparative Example 1

In Comparative Example 1, the individual sheets had a smaller base weight than those in the Examples 1, 2 and 3; the base weights of the sheets S1 and S2 were 10 g/m$^2$, individually. Other process conditions were totally the same as in the Examples 1, 2 and 3.

Comparative Example 2

In Comparative Example 2, the individual sheets had a larger base weight than those in the Examples 1, 2 and 3; the base weights of the sheets S1 and S2 were 70 g/m$^2$, individually. Other process conditions were totally the same as in the Examples 1, 2 and 3 and the Comparative Example 1.

The whole base weight and apparent thickness of each of the wiper sheets of the Examples 1, 2 and 3 and the Comparative Examples 1 and 2 as well as the thickness of each of these sheets after pressing at a pressure of 1 kg/cm$^2$ were measured, and additionally, the softness of their sheets was examined. The total base weight of each of the wiper sheets was represented in unit g/cm$^2$; the thickness was represented in mm. The softness of each of the wiper sheets was ranked as good (◎), relatively good (○) and poor (×).

The results are shown in Table 3 below.

TABLE 3

| Sample | Comparative Example 1 | Comparative Example 2 | Example 1 | Example 2 | Example 3 |
|---|---|---|---|---|---|
| Base weight of S2 + S1 + S2 (g/m$^2$) | 30 | 300 | 45 | 90 | 210 |
| Base weight of S1 (g/m$^2$) | 10 | 100 | 15 | 30 | 70 |
| Base weight of S2 (g/m$^2$) | 10 | 100 | 15 | 30 | 70 |
| Thickness of wiper sheet (mm) | 2.4 | 2.5 | 2.4 | 2.4 | 2.45 |
| Thickness of wiper sheet after pressing (mm) | 1.0 | 2.2 | 1.5 | 2.0 | 2.2 |
| Softness of wiper sheet | ◎ | × | ◎ | ○ | ○ |

As shown in Table 3, the total base weight of the wiper sheet of the Example 1 was 45 g/m$^2$; the thickness of the whole wiper sheet was 2.4 mm; the thickness thereof after pressing was 1.5 mm. Furthermore, the wiper sheet was very soft, which was ranked as ◎.

The total base weight of the wiper sheet of the Example 2 was 90 g/m$^2$, and the apparent thickness thereof was 2.4 mm, which was the same as that of the sheet of the Example 1. However, the thickness after pressing was 2.0 mm, which was larger than the thickness of the Example 1. Furthermore, the softness of the sheet was ranked as ○, which indicates that the softness was more or less poorer than the softness of the Example 1, reflecting the increase of the base weight.

The total base weight of the wiper sheet of the Example 3 was 210 g/m$^2$, and the apparent thickness was 2.45 mm, which was slightly larger than those of the Examples 1 and 2; the thickness after pressing was 2.2 mm, which was larger than those of the Examples 1 and 2 and was sufficient enough to retain the bulkiness. However, the softness was slightly poorer than the softness of the Example 1 but was ranked as good with the assessment of ○.

Because the individual sheets S1 and S2 had base weights as small as 10 g/m$^2$ in the Comparative Example 1, the base weight of the whole wiper sheet was as small as 30 g/m$^2$. Thus, the thickness after pressing was 2.4 mm, with no difference from those of Examples 1 and 3, but the thickness after pressing was as small as 1.0 mm. Thus, the resulting wiper sheet was extremely soft.

Because the individual sheets S1 and S2 had base weights as large as 100 g/m$^2$ in the Comparative Example 2, the base weight of the whole wiper sheet was as large as 300 g/m$^2$. Thus, the thickness prior to pressing was as large as 2.2 mm, so that the resulting wiper sheet could be retained at a highly bulky state. However, the softness was low due to the bulkiness. The wiper sheet was ranked as ×.

The test results described above indicate that if the sheets S1 and S2 are of a too small base weight, the resulting wiper sheet can keep softness but gets slim after pressing so the sheet cannot keep its bulkiness during wiping. Additionally, the nerve of the sheet is weakened. If the base weight is too large, adversely, the thickness after pressing is so large that the sheet bulkiness can be retained high during wiping work, but the nerve of the wiper sheet is so excessively strong, giving stiff touch. Thus, the wiper sheet is hard to be handled with hands; the wiper sheet is hardly deformable along the shape of an area to be wiped, with less effect of wiping being exerted.

Thus, the base weight of each of the individual sheets is preferably 15 g/m$^2$ or more to 75 g/m$^2$ or less. As used in the tests described above, a wiper sheet of a three-layer structure comprising sheet S2 bonded to both the front and back surfaces of sheet S1 has the total body weight of preferably 45 g/m$^2$ or more to 225 g/m$^2$ or less; a wiper sheet of a two-layer structure comprising sheets S1 and S2 has the total body weight of preferably 30 g/m$^2$ or more to 150 g/m$^2$ or less. The wiper sheet 1 formed from the sheets S1 and S2 with such body weights can keep high bulkiness during wiping operation but still remains soft, and therefore, the wiper sheet is easily held with hands, involving higher effect of wiping off stain.

EMBODIMENT II

Other examples of the wiper sheet 1 of the present invention were formed as water-soluble wiper sheets, by using water-soluble sheets as the sheets S1 and S2 and overlaying the water-soluble sheets together. Then, the following test was conducted on the water-soluble wiper sheets. As the examples and comparative examples, wiper sheets of the same structure as shown in FIG. 1 and FIG. 3 were produced. As shown in Table 4 below, except that the individual examples and the comparative examples corresponding to the examples were different from each other in terms of the expansion ratio of the water-soluble sheets, these were produced under absolutely the same conditions.

| Water-soluble sheets S1 and S2 | |
|---|---|
| Conifer kraft pulp (N-BKP) | 90% by weight |
| Binder | 10% by weight |

As the conifer kraft pulp, use was made of pulp fiber beaten and decomposed, so that the filtrate of an aqueous solution of the pulp fiber in dispersion might be 600 ml, as measured by CSF (Canadian Standard Freeness). As the binder, use was made of the Na salt of carboxymethyl cellulose with a degree of etherification of 0.4 (manufactured by Nichirin). The term "degree of etherification" means the ratio of hydroxyl groups of the cellulose in the conifer kraft pulp bounded to the carboxyl groups. One of glucose molecules which compose the cellulose have 3 hydroxyl groups. In case that all hydroxyl groups of the glucose molecule are bounded with carboxyl groups, the degree of etherification of the glucose molecule is 3.0. The binder swells in water, so that the adhesion potency thereof is reduced. The binder was added to an aqueous solution of the conifer kraft pulp in dispersion to a final concentration of 10% by weight to the weight of the pulp fiber contained in the aqueous solution.

Using a routine Yankee paper machine or a paper machine, a water-soluble sheet with a base weight of 25 g/m$^2$ was produced, which was then subjected to crinkling process. The expansion ratio of the crinkling-processed water-soluble sheet was modified in each of the Examples and Comparative Examples.

Adhesive for bonding water-soluble sheets together

As the adhesive for bonding water-soluble sheets together, use was made of an aqueous solution containing water-soluble carboxymethyl cellulose with an etherification degree of about 0.8 or more to 1.0 or less (Product No.2280, manufactured by Daicel Chemicals, Co. Ltd.) of 0.2% by weight.

The adhesive was gravure printed on both the front and back surfaces of the sheet S1, to coat the adhesive in a striped pattern. Subsequently, the sheet S2, S2 were overlaid on both the front and back surfaces of the sheet S1. As shown in FIG. 3(A), then, the sheets S2, S2 overlaid on the sheet S1 was held between heating plate 5 and heating plate 4, both having protrusions 5a, . . . , 5a in the same pattern as the pattern of the adhesive parts a, . . . , a and then, pressing the three sheets together under moistening, these sheets were bonded together. In such manner, a sheet of a three-layer structure was produced.

Expansion ratio

Sheets of a three-layer structure comprising sheet S1 and S2 with expansion ratios, as shown as Examples and Comparative Examples, were impregnated with liquid chemicals, whereby the sheet S2 swelled. The dimension of the thickness of the whole wiper sheet 1 was measured. The results are shown in Table 4.

with a lower expansion ratio is 20% or more to 80% or less, the thickness of the resulting wiper sheets is 0.6 mm or more. Compared with Comparative Example 1 comprising a simply laminated three-layer sheet, therefore, the thickness of the resulting wiper sheets was increased by 50% or more. Thus, the difference in expansion ratio between the sheets S1 and S2 is preferably 20% or more, more preferably 30% or more. If the thickness of the resulting wiper sheet 1 is too large, alternatively, the wiper sheet is too bulky when the sheet is overlaid to each other for packing. Therefore, the difference in expansion ratio between the sheets S1 and S2 is preferably 80% or less, more preferably 60% or less.

What is claimed is:

1. A disposable wiper sheet comprising a plurality of sheets overlaid together and partially bonded together at a plurality of adhesive parts, wherein one sheet or more sheets among the said sheets is/are processed by crinkling process so that the one sheet or more sheets expands/expand due to the reversion of crinkles when the one sheet or more sheets is/are impregnated with liquid chemicals;

the other sheet or sheets is/are processed by crinkling process so that the other sheet or sheets expands/expand at a lower expansion ratio than the expansion ratio of the aforementioned one sheet or more sheets due to the reversion of crinkles when the other sheet or sheets is/are impregnated with liquid chemicals or the other sheet or sheets is/are not processed by crinkling process;

the adhesive parts where the one sheet or more sheets with a higher expansion ratio and the other sheet or sheets with a lower expansion ratio or the non-crinkle-processed sheets are partially bonded together are aligned at intervals in a direction of intersecting the direction of the extension of the crinkles formed on the one sheet or more sheets to form a plurality of rows, such that the adhesive parts and the intervals therebetween in each row respectively oppose the adhesive parts and the intervals therebetween in adjacent rows; and at least the one sheet or more sheets with a higher expansion ratio expands/expand between said opposed intervals more than between said opposed adhesive parts, in each of the regions between the rows, due to the difference in expansion ratio between the two types

TABLE 4

|  | Comparative Example 1 | Comparative Example 2 | Example 1 | Example 2 | Example 3 | Example 4 |
|---|---|---|---|---|---|---|
| Expansion ratio of S2 (%) | 0 | 10 | 20 | 30 | 60 | 80 |
| Expansion ratio of S1 (%) | 0 | 0 | 0 | 0 | 0 | 0 |
| Difference in expansion ratio between S2 and S1 (%) | 0 | 10 | 20 | 30 | 60 | 80 |
| Thickness of wiper sheet (mm) | 0.4 | 0.45 | 0.6 | 0.65 | 1.85 | 1.9 |

Results of measurement

As shown in Table 4, if the difference in expansion ratio between sheet S2 with a higher expansion ratio and sheet S1 of sheets due to the reversion of the crinkles when the sheets are impregnated with liquid chemicals further wherein each of the adhesive parts is formed in a short line and is formed obliquely to the direction of the extension of the crinkles formed on the one sheet or more sheets with a higher expansion ratio in such a manner that the crinkles extending over the regions on both sides of each of the rows are interrupted by the adhesive parts;

the interval between the aligned adhesive parts in a row is 0.5 mm or more to 3.0 mm or less, the dimension of the adhesive part in said intersecting direction is equal to or less than the interval between the aligned adhesive parts in a row, and the interval between the rows of the aligned adhesive parts is 7.5 mm or more to 15.0 mm or less; and the base weight of each of the sheets is 15 g/m2 or more to 75 g/m2 or less.

2. A disposable wiper sheet according to claim 1, wherein the individual sheets overlaid together are water-soluble sheets which are decomposed in water.

3. A disposable wiper sheet according to claim 2, wherein a binder contained in the water-soluble sheets and an adhesive to bond the water-soluble sheets at the adhesive parts are made of the same compound and the water-soluble sheets are impregnated with aqueous liquid chemicals suppressing the solubilization in water of the binder and the adhesive.

4. A disposable wiper sheet according to claim 2, wherein a binder contained in the water-soluble sheets is used as an adhesive to bond the water-soluble sheets at the adhesive parts and the water-soluble sheets are impregnated with aqueous liquid chemicals suppressing the solubilization in water of the binder.

5. A disposable wiper sheet according to claim 1, wherein a plurality of pores are punctured at least through the one sheet or more sheets to reduce the buoyancy of the wiper sheet.

6. A disposable wiper sheet according to claim 1, wherein the sheets with a higher expansion ratio are bonded to both the front and back surfaces of the other sheet with a lower expansion ratio or the non-crinkle-processed sheet.

* * * * *